(12) United States Patent
Kuo

(10) Patent No.: US 6,452,513 B1
(45) Date of Patent: Sep. 17, 2002

(54) NODAL POINT ARRANGEMENT FOR KEYS ON A KEYBOARD

(75) Inventor: Chi-Cheng Kuo, I Lan Hsien (TW)

(73) Assignee: Movita Technologies Inc. (TW)

( * ) Notice: Subject to any disclaimer, the term of this patent is extended or adjusted under 35 U.S.C. 154(b) by 0 days.

(21) Appl. No.: 09/514,363

(22) Filed: Feb. 28, 2000

(51) Int. Cl.[7] .............................................. H03K 17/94
(52) U.S. Cl. ......................... 341/26; 341/22; 400/486; 361/680
(58) Field of Search ............................. 341/26, 22, 20; 361/680; 400/496

(56) References Cited

U.S. PATENT DOCUMENTS

| | | | | |
|---|---|---|---|---|
| 4,615,629 A | * | 10/1986 | Power | 341/22 |
| 4,680,572 A | * | 7/1987 | Meguire et al. | 341/24 |
| 4,963,044 A | * | 10/1990 | Warner | 400/472 |
| 5,128,672 A | * | 7/1992 | Kaehler | 341/23 |
| 5,189,416 A | * | 2/1993 | Estes | 341/22 |
| 5,430,443 A | * | 7/1995 | Mitchell | 341/22 |
| 5,450,078 A | * | 9/1995 | Silva et al. | 341/22 |
| 5,660,488 A | * | 8/1997 | Miller | 340/407.2 |
| 6,053,647 A | * | 4/2000 | Parkinson | 400/486 |
| 6,237,846 B1 | * | 5/2001 | Lowell et al. | 235/1 R |
| 6,348,878 B1 | * | 2/2002 | Tsubal | 341/20 |

* cited by examiner

Primary Examiner—Michael Horabik
Assistant Examiner—Albert K. Wong
(74) Attorney, Agent, or Firm—Troxell Law Offices PLLC (57) ABSTRACT

A nodal point arrangement of keys on a keyboard comprises a nodal point layout of 8 rows and 16 columns, having 144 nodal points, some of the nodal points for switching with single key pressing, and rest of the nodal points for switching with two or more keys pressing. RCTRL and LCTRL are lined up in a row or a column to form a set. RSHIFT and LSHIFT are lined up in a row or a column to form a set either. RALT and LALT are lined up in a row or a column to form a set either. These three sets are disposed at the row or the column different with each other. APP is disposed at a row or a column same as either one of said three set. Fn is not allowed to locate at a row or a column same as RCTRL, LCTRL, RSHIFT, LSHIFT, RALT, LALT, and LWIN.

2 Claims, 8 Drawing Sheets

| LWIN | APP | LCTRL | RCTRL | LSHIFT | RSHIFT | LALT | RALT |
|------|-----|-------|-------|--------|--------|------|------|
| v    | v   |       |       |        |        |      |      |
| v    |     | v     |       |        |        |      |      |
| v    |     |       | v     |        |        |      |      |
| v    |     |       |       | v      |        |      |      |
| v    |     |       |       |        | v      |      |      |
| v    |     |       |       |        |        | v    |      |
| v    |     |       |       |        |        |      | v    |
|      |     | v     |       | v      |        |      |      |
|      |     | v     |       |        | v      |      |      |
|      |     |       | v     | v      |        |      |      |
|      |     |       | v     |        | v      |      |      |
|      |     | v     |       |        |        | v    |      |
|      |     | v     |       |        |        |      | v    |
|      |     |       | v     |        |        | v    |      |
|      |     |       | v     |        |        |      | v    |
|      |     |       |       | v      |        | v    |      |
|      |     |       |       | v      |        |      | v    |
|      |     |       |       |        | v      | v    |      |
|      |     |       |       |        | v      |      | v    |

PC 98 KEYBOARD SPECIFICATION (PRIOR ART)
FIG. 4

NODAL POINT ARRANGEMENT FOR KEYS ON A KEYBOARD

BACKGROUND OF tHE INVENTION

1. Field of the Invention

The present invention relates to a nodal point arrangement for keys on a keyboard in a notebook computer, and particular to an improvement of nodal point arrangement regarding keys on a keyboard used in a notebook computer.

2. Description of Related Art

A keyboard, which has been adopted for years, is a primary input tool for a computer in spite of many other available input devices. Because the keyboard is the simplest and easiest input periphery, it is not possible to be replaced completely by other input devices. Especially, the keyboard has been made a non-separable part in a notebook computer.

In fact, the actuation of a keyboard is by way of circuit nodal points under the keys. When a key is pressed, a nodal point corresponding to the key is touched to form a short circuit. Then, the software senses the short circuit to perform subsequent actions such as displaying on the screen, and driving programs in the computer to execute the command represented by the key.

Figure 1:
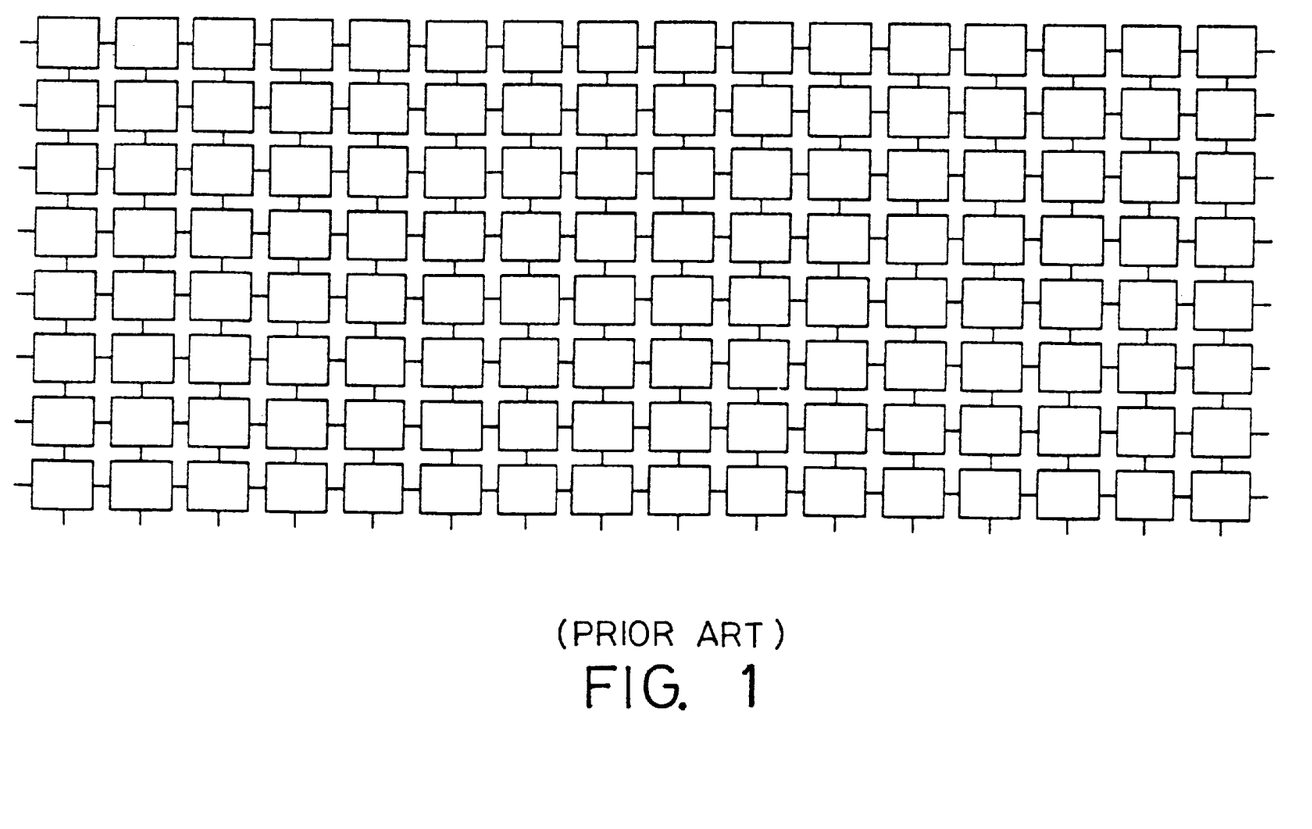
FIG. 1 is a diagram illustrating a prior art arrangement for nodal points in a keyboard.
Figure 2:
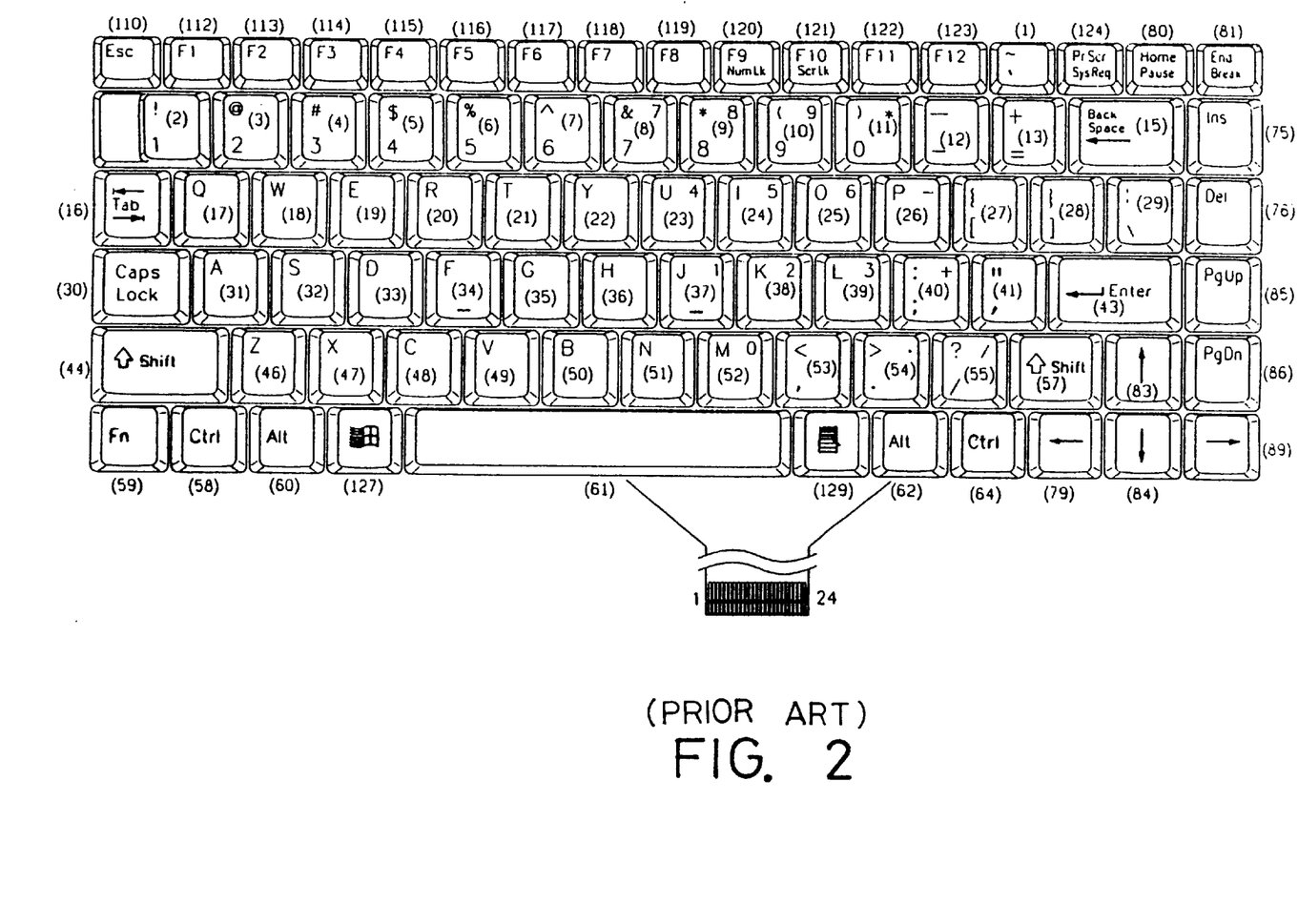
FIG. 2 is a plan view illustrating a prior art arrangement for switch keys on a keyboard.
Figure 3:
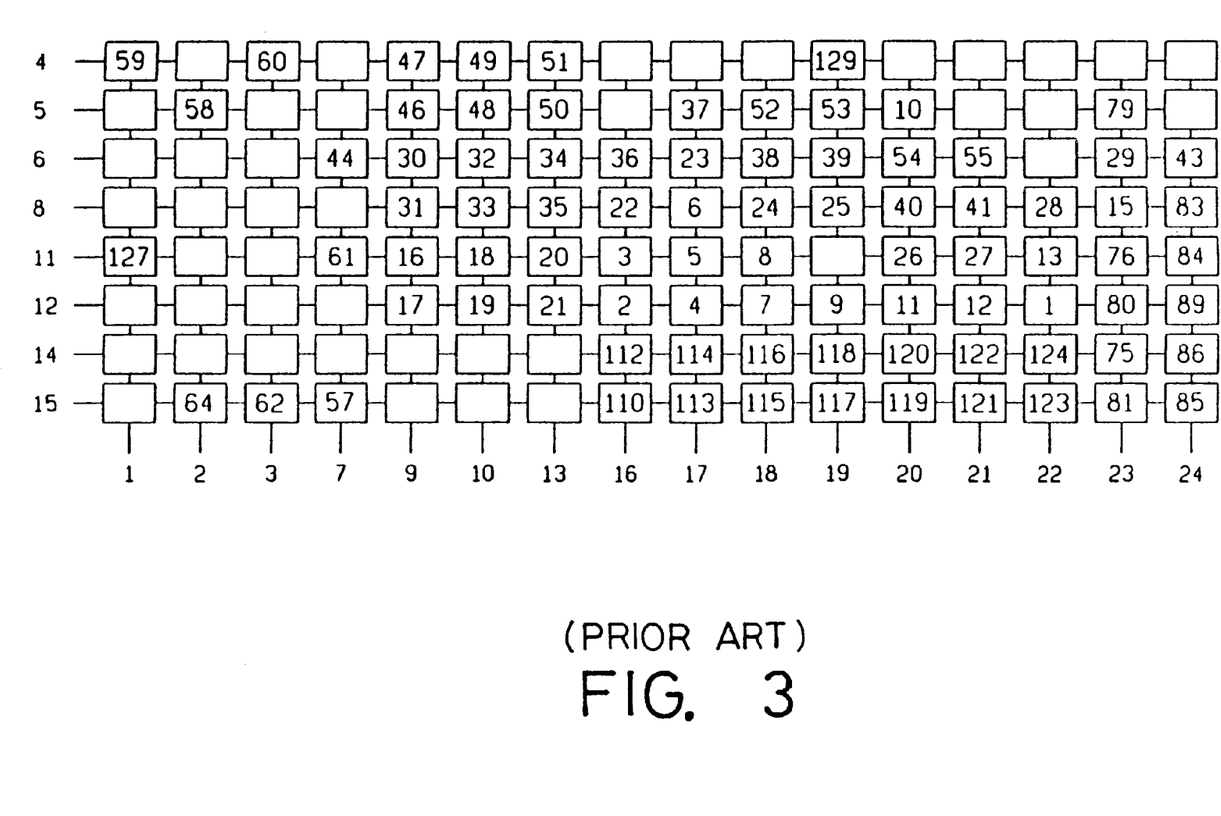
FIG. 3 is a diagram illustrating a prior art arrangement for nodal points shown in FIG. 1 corresponding to locations of switch keys shown in FIG. 2.

It is conceivable that pressing a single key normally generates merely a signal and two signals will generate at two places in case of pressing double keys. As for the keyboard in a notebook computer, the specification thereof is a matrix of 16 columns and 8 rows as shown in FIG. 1 and that is there are 144 nodal points. FIG. 2 shows a prior art switch key layout in a keyboard. FIG. 3 shows the nodal points with respect to the keys shown in FIG. 2. As shown in FIG. 3, a key being pressed results in other 15 nodal points in the same row and other 7 nodal points in the same column being disconnected completely. In case of two keys being pressed at the same time, there are more nodal points are invalid accordingly. Therefore, all the keys on the keyboard in a notebook computer are not possible to keep active and the number of active keys are almost less than ninety actually. Comparing to a big keyboard for a typical personal computer, the keyboard on a notebook computer is less functional and this is a bottleneck has to be solved effectively.

Moreover, due to input commands being getting complicated, it is necessary to increase the required keys. But, the keyboard on a notebook computer has a limited space to provide an additional zone for functional keys such that it has been obliged to use a functional key (Fn) together with another key to input a command. In order to effect various input commands, it is necessary to use three keys together instead of two keys. However, it is not possible for the small keyboard provided in any notebook computer to perform the operation of pressing three keys together.

Figure 4:
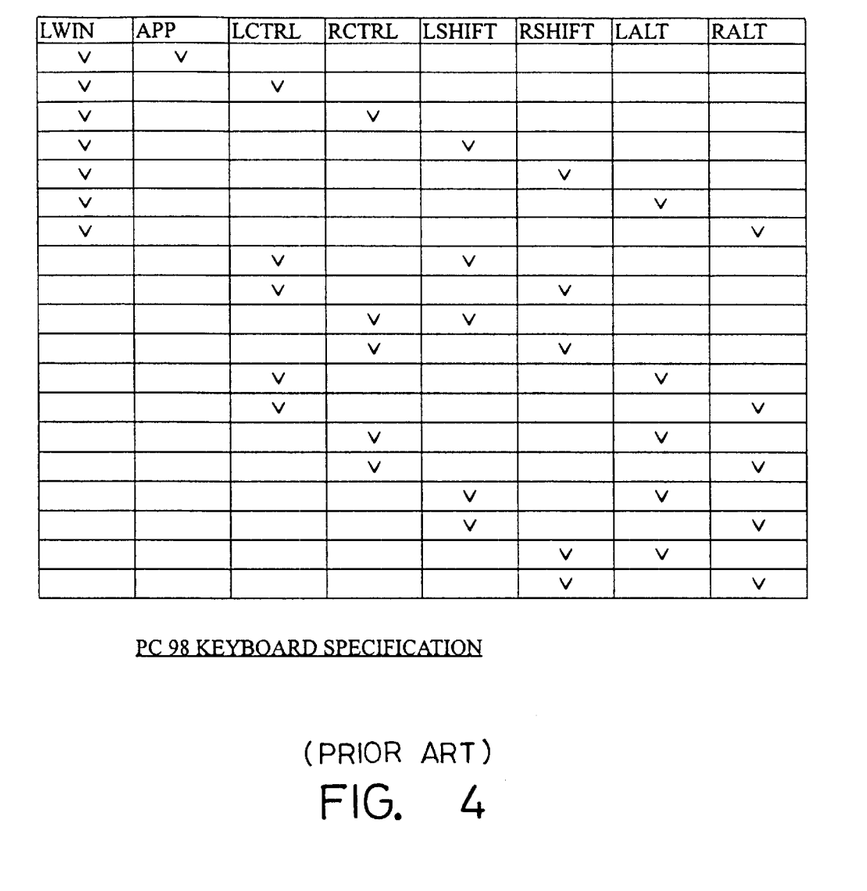
FIG. 4 is a diagram of valid 3-key combinations for basic functions.

For instance, a PC 98 keyboard specification published by Microsoft Corporation has listed valid 3-key combinations in FIG. 4 and each valid 3-key combination includes two keys together with an ordinary key in a way of being pressed effectively. Each valid 3-key combination applied in a big keyboard is exactly three keys but four keys are required for the notebook computer. The fourth key required is the Fn key due to no specific zone for functional keys available. Therefore, it leads to a more difficult job to arrange nodal points of four key pressing in a notebook computer.

Indeed, the way for pressing a valid 3-key combination is required for the software usage. There are some key combinations for the software listed hereinafter as a reference.

Examples for the functions belonged to a operation system of Windows 9X are in the following:

| | |
|---|---|
| Win + R | executing dialogue box |
| SHIFT + Win + M | canceling all and reducing to minimum |
| Win + F1 | instruction for Windows |
| Win + f | searching file or folder |
| CTRL + Win + F | searching the computer |

Example for Microsoft Word application are in the following:

| | |
|---|---|
| CTRL + N | opening new file |
| ALT + CTRL + S | splitting document |
| ALT + CTRL + HOME | browsing document |
| CTRL + SHIFT + P | changing size of letter type |
| CTRL + SHIFT + > | enlarging letter type |

Example for Microsoft Excel application are in the following:

| | |
|---|---|
| CTRL + SHIFT + F3 | building a name byway of column and field tab |
| CTRL + SHIFT + : | time input |
| CTRL + SHIFT + * | selecting a present area around the acting storage cell (The present area refers to a area enclosed by a blank bar and a blank field.) |

Example for ACDSee application are in the following:

| | |
|---|---|
| CTRL + SHIFT + V | preview the selected image |
| CTRL + (Num '+') | automatically size columns in detail View (CTRL + Fn + ':' for notebook computer) |

In order to meet the operation requirements, a notebook computer supplier offers a 10×16 matrix instead of 8×16 matrix to increase the number of nodal points. However, this is a way resulting in substantial variations of the computer such as the software, the hardware, the mechanism, and the size such that a great deal of manpower and material have to be waste accordingly. In addition, the original molding tool and equipment have to be left unused completely. Therefore, an increased columns and rows for nodal points will cause a tremendous loss so that it is an unfavorable improvement if there is a possibility to have a better alternative under a condition of keeping 8×16 matrix unchanged.

SUMMARY OF THE INVENTION

An object of the present invention is to provide a nodal point arrangement for keys on a keyboard with which a combination of 3 keys or more can be obtained in a prior art nodal point layout of 8×16 matrix without increasing the dimension of the matrix size.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Referring to FIG. 4, basically, keys usually for three key combinations or more than three key combinations are LWIN, APP, LCTRL, RCTRL, LSHIFT, RSHIFT, LALT, and RALT (8 keys). The RWIN key is a conserved key so that it is not discussed then. Because the keyboard in a notebook computer is not provided with a zone of functional keys, the FN key is utilized to combine one of other keys for command input. Hence, the FN key has to be considered in a notebook computer.

As the arrangement of nodal points has been described previously, the nodal points are provided with a matrix of 8 transverse rows and 16 longitudinal columns. That is, there are 144 nodal joints totally. In order to dispose above said 8 keys with the Fn key sufficiently, it is necessary to analyze the feature of each key, in which:

RCTRL and LCTRL are not possible to be pressed together so that both of them can be disposed at the same row or column.

RSHIFT and LSHIFT are not possible to be pressed together either so that both of them can be disposed at the same row or column.

RALT and LALT are not possible to be pressed together so that both of them can be disposed at the same row or column.

APP is not possible to be pressed together with RCTRL, LCTRL, RSHIFT, LSHIFT, RALT, and LALT respectively so that APP can be disposed with RCTRL, LCTRL, RSHIFT, LSHIFT, RALT, and LALT respectively at the same row or column. Nevertheless, APP is possible to be pressed together with LWIN and both of them are not able to dispose at the same row and column.

Fn has a function of shift so that it is not able to dispose Fn with RCTRL, LCTRL, RSHIFT, LSHIFT, RALT, LALT, and LWIN respectively at the same row or column.

RCTRL can be disposed with LCTRL at the same row or column, RSHIFT can be disposed with LSHIFT at the same row or column, and RALT can be disposed with SALT at the same row or column either. But, these three set of keys have to be arranged in a row or column different with one another.

Figure 5:
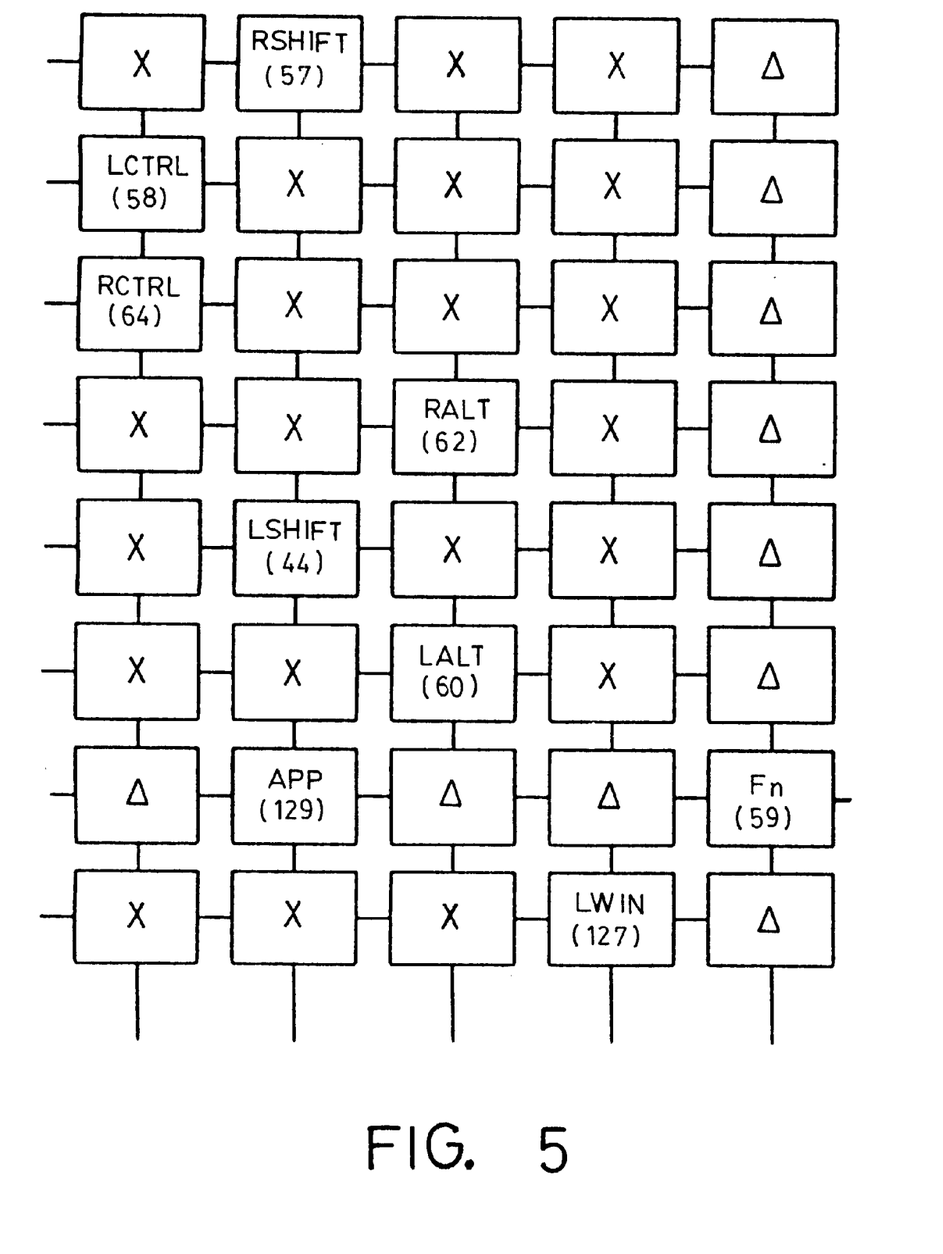
FIG. 5 is a diagram illustrating an arrangement for nodal points in a first embodiment of the present invention.
Figure 6:
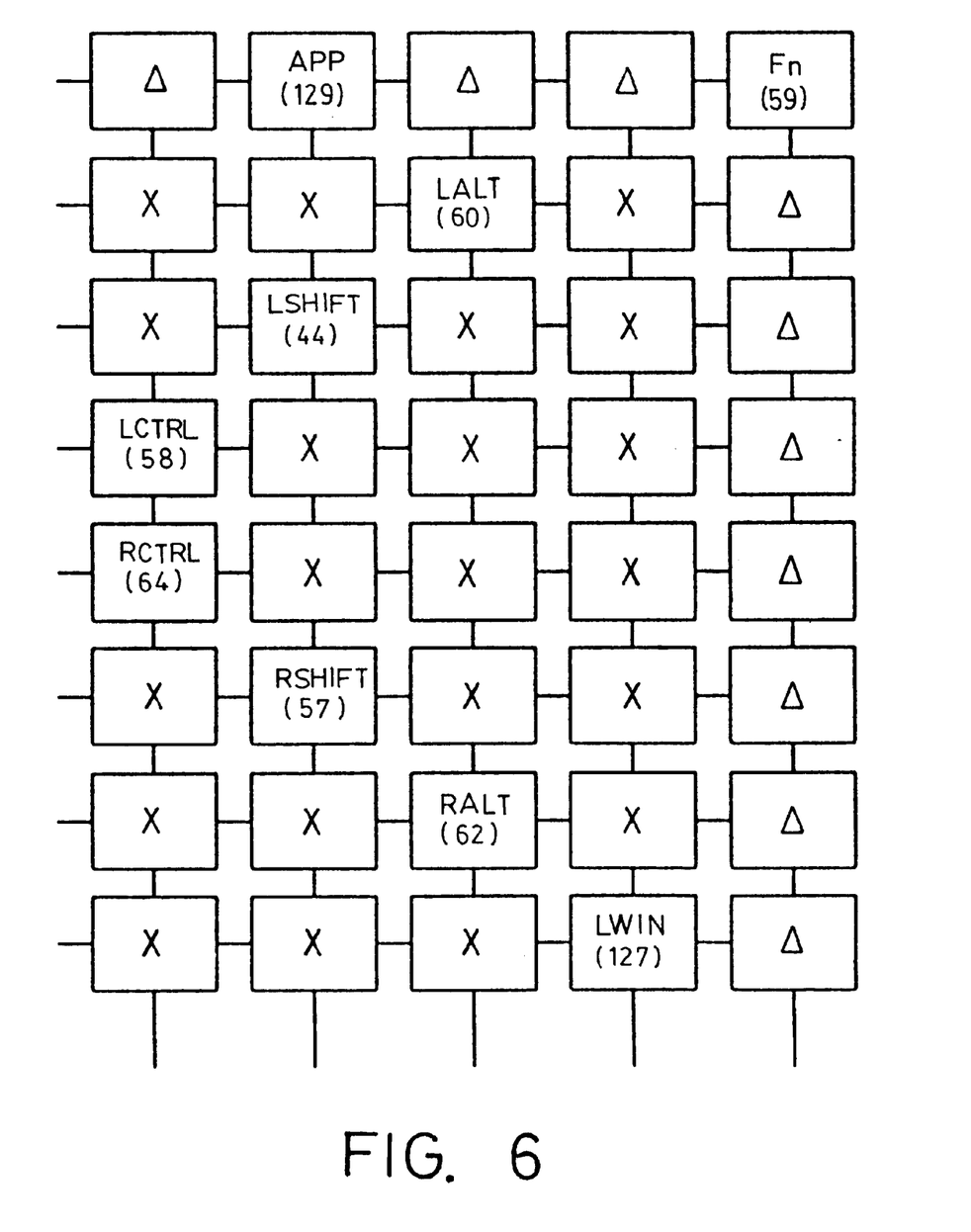
FIG. 6 is a diagram illustrating an arrangement for nodal points in a second embodiment of the present invention.
Figure 7:
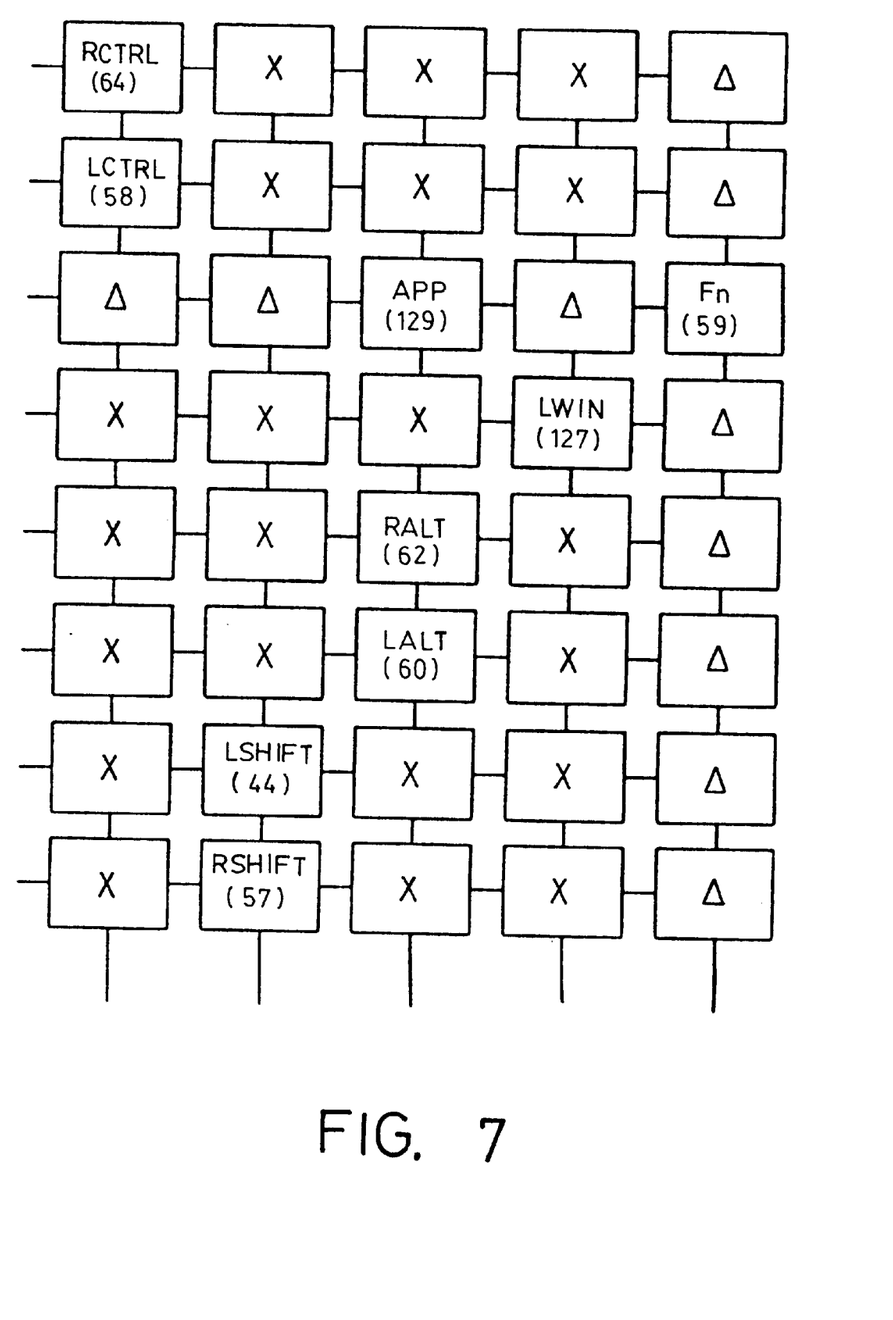
FIG. 7 is a diagram illustrating an arrangement for nodal points in a third embodiment of the present invention.

The embodiments of the present invention are illustrated in FIGS. 5 to 7. It can be seen in the figures that all functional keys are disposed at valid. nodal points, in which "X" represents an invalid nodal point for setting up a key, and "Δ" represents a valid nodal point for setting up a key. Although the functional keys shown in the figures are arranged in a matrix of 8 rows×5 columns, it does not mean the functional keys have to be disposed in these 8 rows or 5 columns. The functional keys can be put at any valid location in any row or column confined in the whole area of a keyboard.

Figure 8:
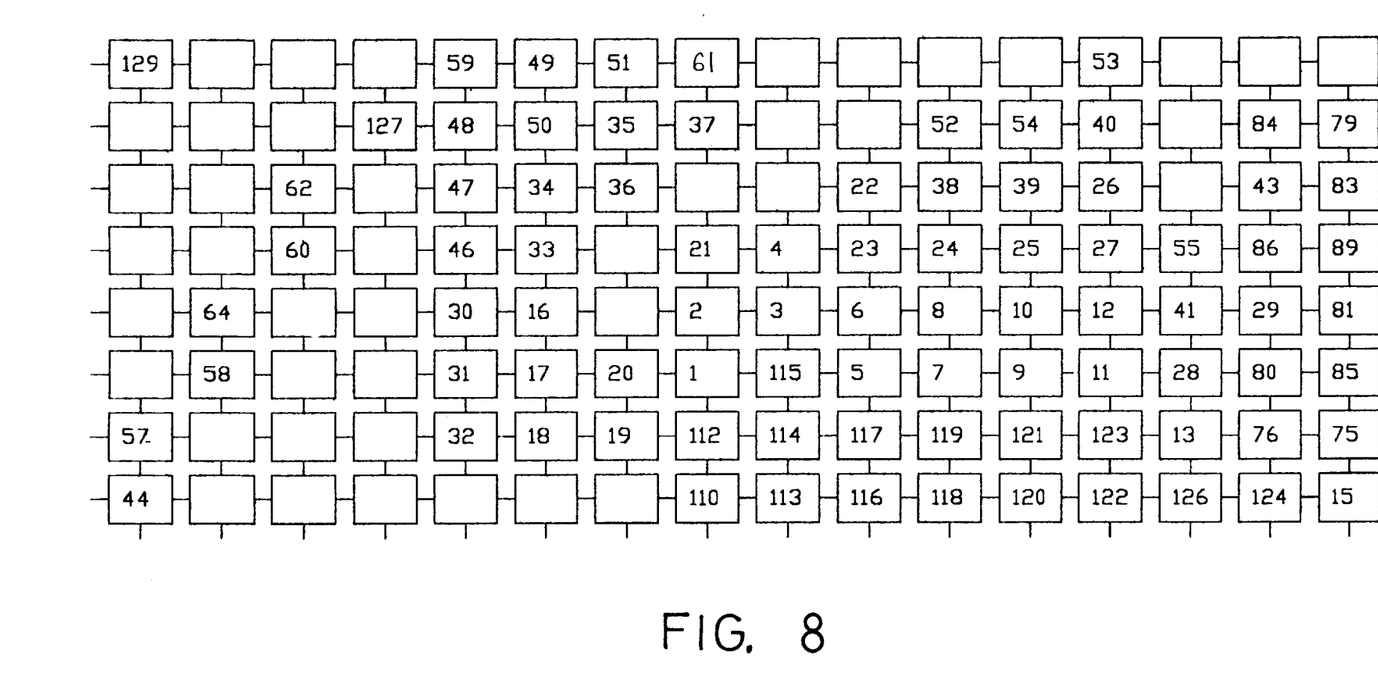
FIG. 8 is a diagram illustrating a complete arrangement of the keys with respect to the nodal points in an embodiment according to the present invention.

Referring to FIG. 8, the nodal points according to the present invention being actually matched with all the keys on a keyboard is illustrated. The Fn key (No. 59) is not possible to be pressed together with nodal point numbers 48, 47, 46, 30, 31, and 32 such that they are able to be disposed on a column completely. By the same token, the Fn key (No. 59) is not possible to be pressed together with numbers 129, 49, 51, 61, and 53 such that they are able to be disposed on a row completely. Therefore, it is sufficient that the valid keys can be arranged appropriately by way of 86 nodal points.

It is appreciated that valid 3 keys combinations or above can be obtained in a prior art nodal point specification of 8×16 matrix by way of the arrangement of the present invention without increasing the size of the matrix. Thus, the arrangement for nodal points according to present invention allows the keys on a keyboard can be compatible with the operation requirements of the software such as Windows 9X system program, Microsoft Excel application program, ACDSee application program. Even more, the arrangement for nodal points of the present invention allows the keys on a keyboard meet PC 98 Keyboard Specification of Microsoft windows.

While the invention has been described with reference to the preferred embodiments thereof, it is to be understood that modifications or variations may be easily made without departing from the spirit of this invention, which is defined by the appended claims.

What is claimed is:

1. A nodal point arrangement of keys on a keyboard, comprising:

a nodal point layout of 8 rows and 16 columns, having 144 nodal points, some of the nodal points for switching with single key pressing, and the rest of the nodal points for switching with two or more keys pressing;

characterized in that RCTRL and LCTRL keys are lined up in a row or a column to form a set, RSHIFT and LSHIFT keys are lined up in a row or a column to form a set, and RALT and LALT keys are lined up in a row or a column to form a set; said three sets are disposed at the row or the column different from each other; APP key is disposed at a row or a column that is the same as any one of said three sets; and Fn key is not located at a row or a column with the RCTRL, LCTRL, RSHIFT, LSHIFT, RALT, LALT, or LWIN keys.

2. A nodal point arrangement for keys on a keyboard as defined in claim 1, wherein the nodal point of APP key and the nodal point of Fn key are disposed in the same row or column.

* * * * *